(12) United States Patent
Swanson

(10) Patent No.: US 6,814,803 B1
(45) Date of Patent: Nov. 9, 2004

(54) EXTRUDER HAVING A UNITARY CROSSHEAD BODY

(75) Inventor: John W. Swanson, Portland, OR (US)

(73) Assignee: Advanced Neuromodulation Systems, Inc., Plano, TX (US)

(*) Notice: Subject to any disclaimer, the term of this patent is extended or adjusted under 35 U.S.C. 154(b) by 0 days.

(21) Appl. No.: 10/437,698

(22) Filed: May 14, 2003

(51) Int. Cl.[7] .............................................. B05C 11/02
(52) U.S. Cl. ...................................... 118/125; 118/420
(58) Field of Search ................................ 425/113, 190, 425/467, 468, 114; 118/125, 420, 405, 410

(56) References Cited

U.S. PATENT DOCUMENTS

| | | | |
|---|---|---|---|
| 3,635,621 A | 1/1972 | Miyauchi et al. | 425/113 |
| 4,605,525 A | 8/1986 | Baxter | 264/40.5 |
| 4,710,114 A | 12/1987 | Garner | 425/110 |
| 5,431,867 A | 7/1995 | Matsushita et al. | 264/40.1 |
| 5,458,830 A | 10/1995 | Shin et al. | 264/40.1 |
| 5,498,145 A | 3/1996 | Sikora et al. | 425/71 |
| 5,795,531 A | 8/1998 | Salzmann et al. | 264/408 |

2002/0158357 A1 * 10/2002 Swanson et al.

OTHER PUBLICATIONS

Rauwendaal, Chris, Polymer Extrusion, 1994, pp. 68–79, 102–107, 310–315.

Frados, Joel, Plastics Engineering Handbook of the Society of the Plastics Industry, Inc., fourth edition (1991), pp. 188–191.

* cited by examiner

*Primary Examiner*—Brenda A. Lamb
(74) *Attorney, Agent, or Firm*—Law Office of Timothy E. Siegel; Timothy E. Siegel

(57) ABSTRACT

A micro-extruder, comprising a funnel shaped tip piece defining a front aperture, through which wire is drawn, and a front rim, around which extrudate flows, and which has an outer diameter of less than 3.8 mm (150 mils). In addition, a structurally unitary cross-head body has a front aperture and a protruding rim about this front aperture. The funnel shaped tip piece protrudes through the front aperture. Also, a die having a surface that defines an aperture is adapted and positioned to abut the protruding rim and to form a seal against the protruding rim, so that no extrudate may leak out between the surface defining an aperture and the protruding rim.

4 Claims, 1 Drawing Sheet

EXTRUDER HAVING A UNITARY CROSSHEAD BODY

STATEMENT OF GOVERNMENTAL SUPPORT

This invention was made with government support under 2R44NS34993 awarded by SBIR. The Government has certain rights in the invention.

BACKGROUND OF THE INVENTION

Referring to FIG. 1, in a prior art micro-extruder crosshead assembly 10 for producing a wire coated with extruded insulation, a wedge ring 12 is seated in a crosshead aperture 13 of a crosshead body 14. The wedge ring 12, itself defines a central aperture 16, through which extends a die tip 18 that is anchored inside crosshead body 14. A die 20 having a central aperture 22, abuts wedge ring 12 and accommodates the forward end of the die tip 18.

In operation, wire is drawn, in a forward direction 24, through die tip 18 as pressurized extrudate (typically a molten polymer) is forced through wedge ring aperture 16 and into die aperture 22 so that it congeals about the wire. The pressure of the extrudate pushes against wedge ring 12 in forward direction 24, forcing it against die 20 to form a good seal. By using a wedge ring 12, misalignments between die 20 and wedge ring 12 can be forgiven, because wedge ring 18 can change its orientation slightly so that it seats against die 20 in a close to optimum manner.

Unfortunately, however, as efforts have been made to coat wires having a diameter in the range of 25 microns with a coating of extrudate having a thickness on the order of from 25–50 microns, problems have been encountered because gels form within the crosshead body 14 and cause a degradation of the process. Because of this gel formation, an extruder could not be kept in operation for more than about 10–20 minutes without a deterioration of the finished product occurring. After running the extruder for a number of minutes, pinholes begin to appear in the finished product coated wire.

SUMMARY

The present invention is a micro-extruder, comprising a funnel-shaped tip piece defining a front aperture, through which wire is drawn, and a front rim, around which extrudate flows, and which has an outer diameter of less than 3.8 mm (150 mils). In addition, a structurally unitary cross-head body has a front aperture and a protruding rim about this front aperture. The funnel shaped tip piece protrudes through the front aperture. Also, a die having a surface that defines an aperture is adapted and positioned to abut the protruding rim and to form a seal against the protruding rim, so that no extrudate may leak out between the surface defining an aperture and the protruding rim.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
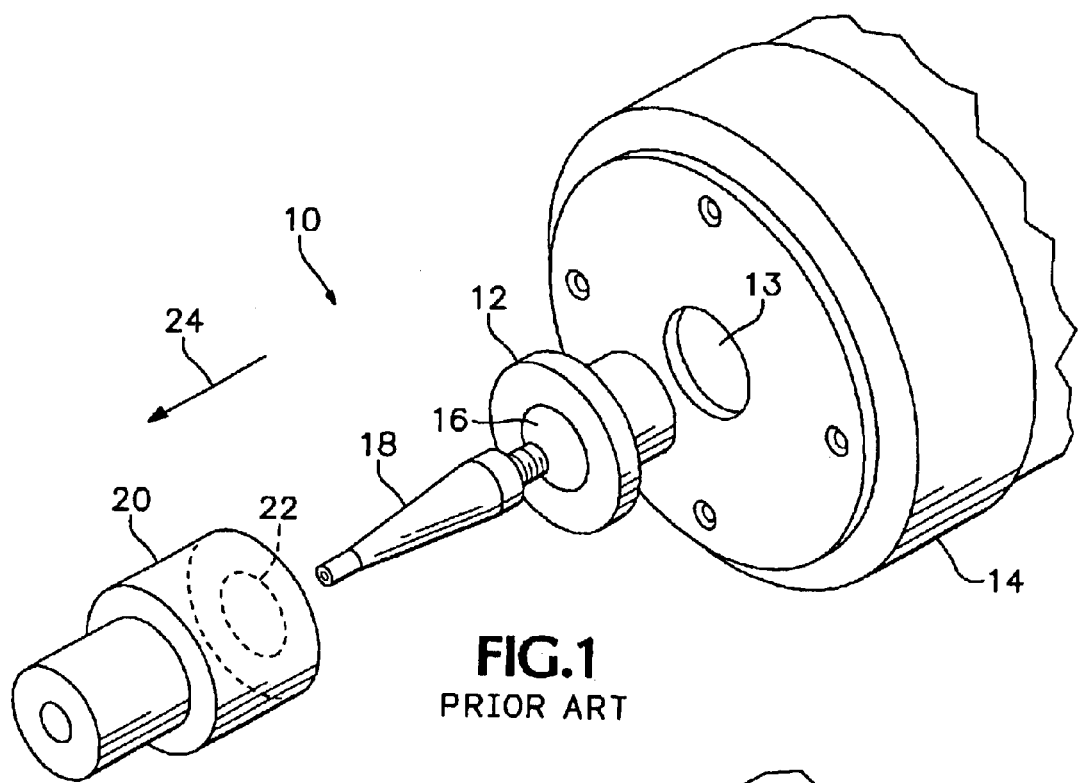
FIG. 1 is an exploded perspective view of a prior art extruder crosshead.
Figure 2:
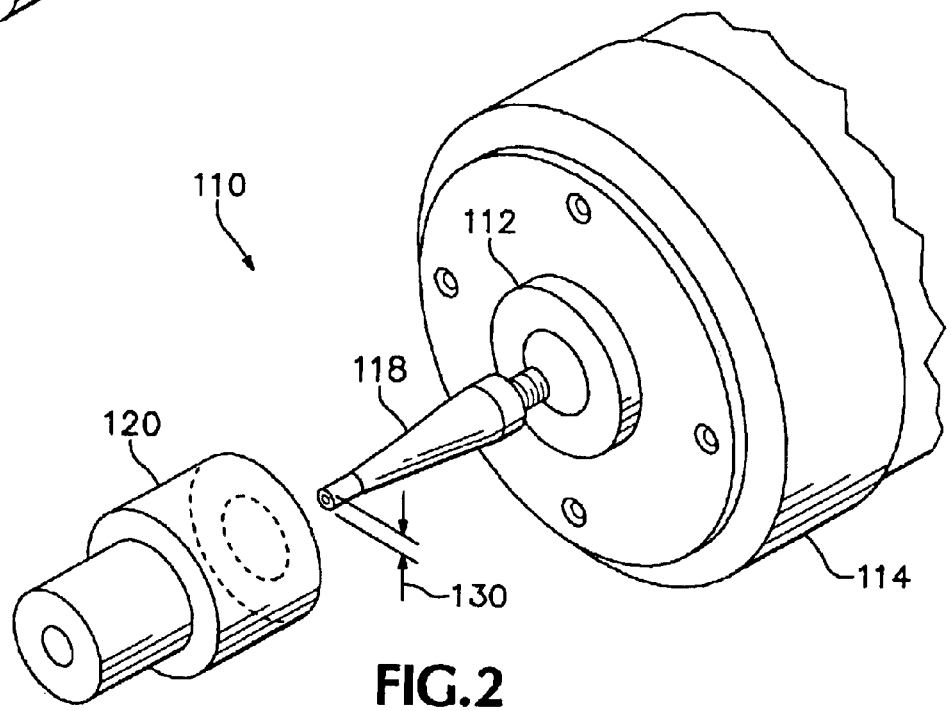
FIG. 2 is an exploded perspective view of an extruder crosshead according to the present invention.

Referring to FIGS. 1 and 2, by replacing crosshead body 14 and wedge ring 12 with a structurally unitary crosshead body 114 having a protruding rim 112, an unexpected result has been obtained in a new type of micro-extruder crosshead assembly 110. Apparently, floating wedge ring 12 caused a disruption in the flow of the extrudate, facilitating the formation of extrudate gels. Moreover, due to advancements in the art of machining, protruding rim 112 and die 120 can be made with surfaces that are flat enough to prevent the leakage of extrudate that wedge ring 12 was designed to prevent. The avoidance of gels is particularly important in a micro-extruder crosshead assembly, such as assembly 110, as opposed to a larger micro-extruder crosshead assembly. In assembly 110 the forward tip of die tip 118 has an outer diameter 124 of 3.8 millimeters (150 mils). In alternative preferred embodiments, die tip 118 has an outer diameter 124 of 3.0 millimeters (118 mils); 2.5 mm (98.5 mils); or 2.0 mm (79 mils).

In this application, when the term "structurally unitary" is used it means that the "structurally unitary item does not have portions that have freedom of movement relative to each other. It does not mean that the structurally unitary item is a single undifferentiated piece of material. The structurally unitary item may be made of several different pieces that are rigidly affixed together.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A micro-extruder, comprising:

(a) a funnel shaped tip piece defining a front aperture, through which wire is drawn, and a front rim, around which extrudate flows, said front rim having an outer diameter of about 3.8 mm (150 mils) or less;

(b) a structurally unitary cross-head body having a front aperture and a protruding rim about said front aperture of said structurally unitary cross-head body, said funnel shaped tip piece protruding through said front aperture of said structurally unitary cross-head body; and (c) a die having a surface defining an aperture that is adapted and positioned to abut said protruding rim and to form a seal against said protruding rim, so that substantially no extrudate may leak out between said surface defining an aperture and said protruding rim.

2. The micro-extruder of claim 1 wherein said front rim has an outer diameter of about 3.0 mm (118 mils) or less.

3. The micro-extruder of claim 1 wherein said front rim has an outer diameter of about 2.5 mm (98.5 mils) or less.

4. The micro-extruder of claim 1 wherein said front rim has an outer diameter of about 2.0 mm (79 mils) or less.

* * * * *